United States Patent
Chen et al.

(10) Patent No.: US 10,986,322 B1
(45) Date of Patent: Apr. 20, 2021

(54) IMAGE WHITE BALANCE PROCESSING METHOD

(71) Applicant: REALTEK SEMICONDUCTOR CORP., Hsinchu (TW)

(72) Inventors: Xiao-Yu Chen, Hsinchu (TW); Gang Shen, Hsinchu (TW); Yang Lu, Hsinchu (TW); Dong-Yu He, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/082,636

(22) Filed: Oct. 28, 2020

(30) Foreign Application Priority Data

May 19, 2020 (CN) .......................... 202010427631.7

(51) Int. Cl.
*H04N 9/73* (2006.01)
*H04N 9/31* (2006.01)

(52) U.S. Cl.
CPC ............. *H04N 9/73* (2013.01); *H04N 9/3182* (2013.01)

(58) Field of Classification Search
CPC .......... H04N 9/735; H04N 9/73; H04N 9/646; H04N 9/64; H04N 9/3182
USPC ........................... 348/655–658, 223.1, 225.1
See application file for complete search history.

(56) References Cited

U.S. PATENT DOCUMENTS

| 5,481,302 A * | 1/1996 | Yamamoto | H04N 9/735 |
| | | | 348/655 |
| 2016/0105656 A1 * | 4/2016 | Lin | H04N 5/2355 |
| | | | 348/223.1 |

* cited by examiner

*Primary Examiner* — Sherrie Hsia
(74) *Attorney, Agent, or Firm* — Birch, Stewart, Kolasch & Birch LLP

(57) ABSTRACT

An image white balance processing method is provided. The image white balance processing method includes: calculating color coordinate points; when it is determined that the color coordinate points are in a first given region, calculating a plurality of weighted averages according to a plurality of coordinate components and a plurality of weight values of color coordinate points of a white given image region, and when it is determined that the color coordinate points are in a second given region, calculating a plurality of averages according to a plurality of coordinate components of color coordinate points of a green given image region; calculating an estimated coordinate point; and calculating a plurality of white balance gains according to the number of a plurality of white given image regions and green given image regions, the plurality of weighted averages, and the estimated coordinate point to compensate for the plurality of given image regions.

11 Claims, 4 Drawing Sheets

| A1 | A2 | A3 |
|----|----|----|
| A4 | A5 | A6 |
| A7 | A8 | A9 |

FIG. 3

IMAGE WHITE BALANCE PROCESSING METHOD

CROSS-REFERENCE TO RELATED APPLICATION

This non-provisional application claims priority under 35 U.S.C. § 119(a) to Patent Application No. 202010427631.7 filed in China, P.R.C. on May 19, 2020, the entire contents of which are hereby incorporated by reference.

BACKGROUND

Technical Field

The present disclosure relates to an image white balance processing method.

Related Art

When an electronic device inputs a color picture, a pixel value in the color picture is determined by an external light source. Different external light sources correspond to different color temperatures, and colors displayed in the color picture are also different. Because human eye's perception of color is dynamically adjusted with a change in intensity and color of the external light source, the human eyes can perceive the same color in different light source environments. However, the electronic device is different from humans, and the color picture input by the electronic device needs to be processed through white balance to achieve the same effect as the color perceived by the human eyes.

A common image white balance processing method is a gray world algorithm. However, the gray world algorithm is only applicable when color information of corresponding pixels in the color picture is approximately evenly distributed. When the colorpicture includes a large number of large green blocks, a ratio disparity in distribution of the color information in the pixels is caused. For example, if the gray world algorithm is used to perform white balance processing, a severe color cast phenomenon is caused. Consequently, the color picture cannot meet the color perceived by the human eyes.

SUMMARY

In some embodiments, an image white balance processing method is provided, including: receiving an image signal, the image signal including a plurality of given image regions, each of the given image regions including a plurality of first color components, a plurality of second color components, and a plurality of third color components; calculating a color coordinate point of each of the given image regions on a given color coordinate plane according to the plurality of first color components, the plurality of second color components, and the plurality of third color components of each of the given image regions; determining whether the color coordinate point of each of the given image regions is in a first given region of the given color coordinate plane, the first given region being a region formed by a plurality of first coordinate points on the given color coordinate plane that are generated by respectively irradiating a plurality of color temperature light sources on gray; when a plurality of white given image regions in the plurality of given image regions are in the first given region, calculating a first weighted average according to a first coordinate component and a first weight value of the color coordinate point of each of the white given image regions, and calculating a second weighted average according to a second coordinate component and a second weight value of each of the white given image regions; determining whether the color coordinate point of each of the given image regions is in a second given region of the given color coordinate plane, the second given region being a region formed by a plurality of second coordinate points on the given color coordinate plane that are generated by respectively irradiating the plurality of color temperature light sources on green; when a plurality of green given image regions in the plurality of given image regions are in the second given region, calculating a first average according to a first coordinate component of each of the green given image regions, and calculating a second average according to a second coordinate component of each of the green given image regions; calculating a first coordinate component and a second coordinate component of an estimated coordinate point in the first given region according to the first average and the second average; calculating a first white balance gain of the first color component according to the number of the plurality of white given image regions, the number of the plurality of green given image regions, the first weighted average, and the first coordinate component of the estimated coordinate point; calculating a second white balance gain of the second color component according to the number of the plurality of white given image regions, the number of the plurality of green given image regions, the second weighted average, and the second coordinate component of the estimated coordinate point; and compensating for the plurality of given image regions according to the first white balance gain and the second white balance gain.

BRIEF DESCRIPTION OF THE DRAWINGS

FIG. 3 is a schematic diagram of an embodiment of an image signal including a plurality of given image regions according to the present disclosure.

DETAILED DESCRIPTION

Figure 1:
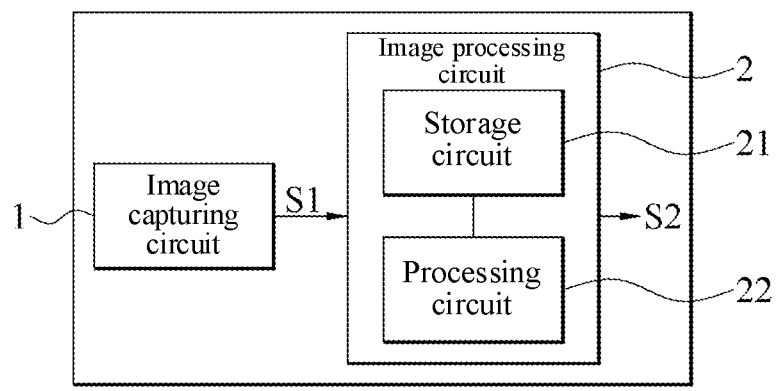
FIG. 1 is a circuit block diagram of an embodiment of an image white balance processing device applying an image white balance processing method according to the present disclosure.

Referring to FIG. 1, FIG. 1 is a circuit block diagram of an embodiment of an image white balance processing device applying an image white balance processing method according to the present disclosure. The image white balance processing device includes an image capturing circuit 1 and an image processing circuit 2. The image processing circuit 2 is coupled to the image capturing circuit 1. The image capturing circuit 1 may output an image signal S1. The image signal S1 may include a plurality of given image regions, each of the given image regions including a plurality of pixels. Each of the pixels includes a first color component, a second color component, and a third color component that represent color information. Different colors are generated according to different proportions of the first color component, the second color component, and the third color component and a combination thereof, and colors corresponding to the plurality of pixels present colors of each of the given image regions. Therefore, according to an ideal given color and a color of the image signal S1, the image processing circuit 2 may perform white balance processing on the image signal S1, and the image processing circuit 2 calculates a white balance gain to perform color cast compensation on the image signal S1. In this way, a color cast of the color of the image signal S1 is avoided, and the image processing circuit 2 outputs a compensated image signal S2 after completing white balance processing. In some embodiments, the image white balance processing device may be a device with an image capturing function such as a camera, a video camera, a mobile phone, or a tablet computer.

In particular, the image processing circuit 2 includes a storage circuit 21 and a processing circuit 22. The processing circuit 22 is coupled to the storage circuit 21. The storage circuit 21 stores coordinate information of a first given region and a second given region on a given color coordinate plane as the aforementioned ideal given color. The aforementioned coordinate information includes a horizontal coordinate component and a vertical coordinate component. In some embodiments, the horizontal coordinate component corresponding to the given color coordinate plane is a coordinate component generated according to the first color component and the third color component among the first color component, the second color component, and the third color component representing the color information, and the vertical coordinate component corresponding to the given color coordinate plane is a coordinate component generated according to the second color component and the third color component among the aforementioned three color components. Therefore, the aforementioned first given region may be a region formed according to a plurality of first coordinate points corresponding to each of a plurality of different color temperature light sources, where three color components of a gray image are generated by respectively illuminating the color temperature light sources on gray, and the first coordinate points are calculated according to the three color components of the gray image on the given color coordinate plane. The aforementioned second given region may be a region formed according to a plurality of second coordinate points corresponding to each of the plurality of different color temperature light sources, where three color components of a green image are generated by respectively illuminating the color temperature light sources on green, and the second coordinate points are calculated according to the three color components of the green image on the given color coordinate plane. The processing circuit 22 may perform white balance processing on the image signal S1 according to the first given region and the second given region.

Figure 2:
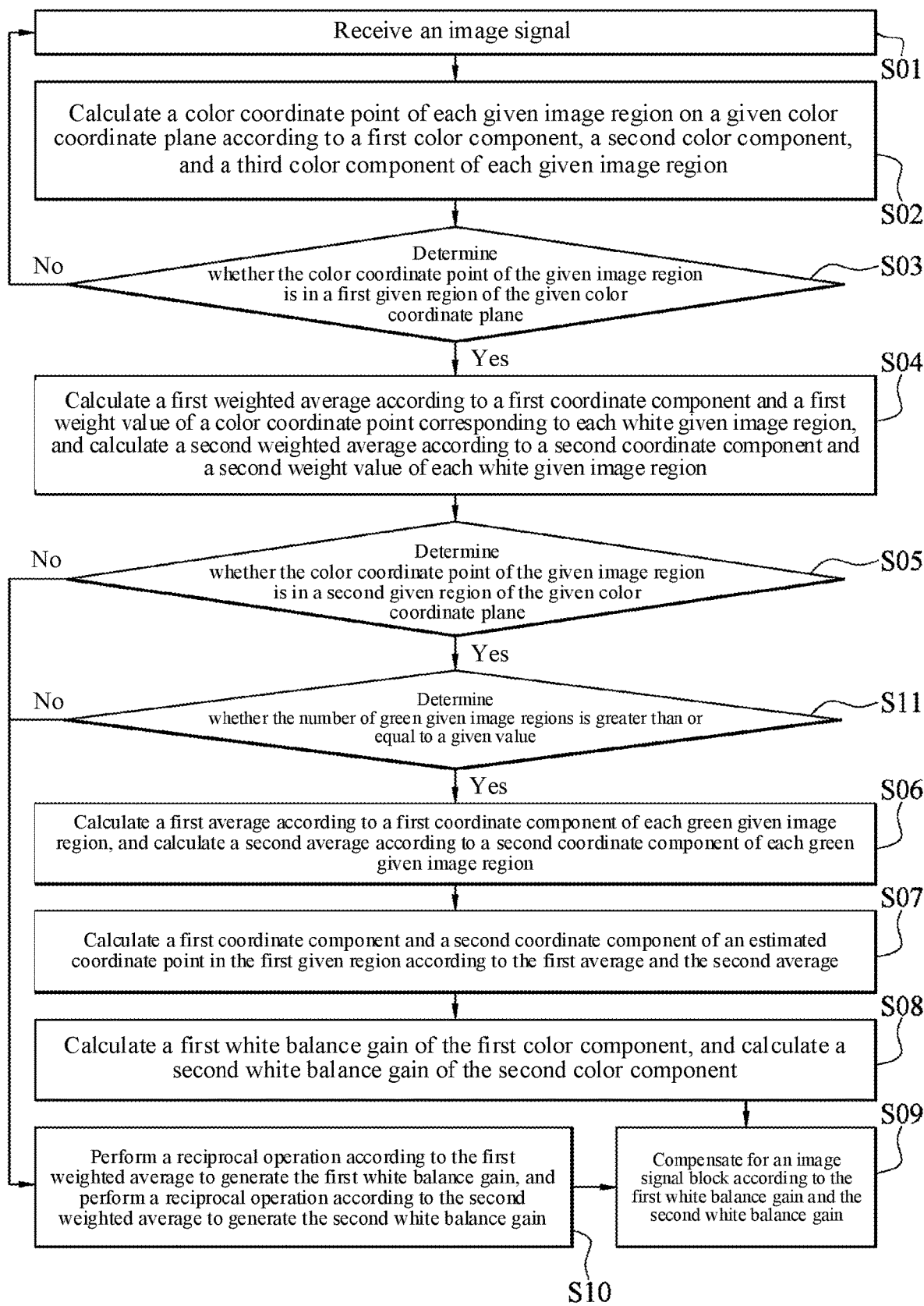
FIG. 2 is a flowchart of an embodiment of an image white balance processing method according to the present disclosure.

In a white balance processing process, referring to FIG. 1 and FIG. 2, after the image processing circuit 2 receives the image signal S1 (step S01), the processing circuit 22 calculates a color coordinate point corresponding to each of the given image regions on the given color coordinate plane according to a first color component, a second color component, and a third color component of each pixel included in each of the plurality of given image regions of the image signal S1 (step S02), so that each of the given image regions corresponds to one color coordinate point on the given color coordinate plane, that is, the number of color coordinate points is equal to the number of the plurality of given image regions, the color coordinate point including a first coordinate component corresponding to a horizontal coordinate axis and a second coordinate component corresponding to a vertical coordinate axis. In step S02, the processing circuit 22 generates a first coordinate component according to a plurality of first color components and a plurality of third color components of each of the given image regions, and generates a second coordinate component according to the plurality of second color components and the plurality of third color components of each of the given image regions.

After the processing circuit 22 generates the color coordinate point corresponding to each of the given image regions, the processing circuit 22 determines whether the color coordinate point of each of the given image regions is in the first given region of the given color coordinate plane (step S03). When a determining result of performing step S03 is that the color coordinate point of the given image region is in the first given region (the determining result is "Yes"), a given image region corresponding to the color coordinate point in the first given region is a white given image region. The processing circuit 22 performs weighted averaging according to a first coordinate component and a weight value (hereinafter referred to as a first weight value) of a color coordinate point corresponding to each white given image region to calculate a first weighted average, and the processing circuit 22 performs weighted averaging according to a second coordinate component and a weight value (hereinafter referred to as a second weight value) of the color coordinate point corresponding to each white given image region to calculate a second weighted average (step S04).

In addition, the processing circuit 22 determines whether the color coordinate point of each of the given image regions is in the second given region of the given color coordinate plane (step S05). When a determining result of performing step S05 is that the color coordinate point of the given image region is in the second given region (the determining result is "Yes"), a given image region corresponding to the color coordinate point in the second given region is a green given image region. The processing circuit 22 performs an averaging operation according to a first coordinate component of a color coordinate point corresponding to each green given image region to calculate a first average, and the processing circuit 22 performs an averaging operation according to a second coordinate component of the color coordinate point corresponding to each green given image region to calculate a second average (step S06). The processing circuit 22 calculates a first coordinate component and a second coordinate component of an estimated coordinate point on the given color coordinate plane according to the first average and the second average (step S07), where the estimated coordinate point is in the first given region.

Based on this, the processing circuit 22 calculates first white balance gains corresponding to first color components of the plurality of given image regions according to the number of a plurality of white given image regions in which the color coordinate points are in the first given region, the number of a plurality of green given image regions in which the color coordinate points are in the second given region, the first weighted average, and the first coordinate component of the estimated coordinate point, and the processing circuit 22 calculates second white balance gains corresponding to second color components of the plurality of given image regions according to the number of the plurality of white given image regions in which the color coordinate points are in the first given region, the number of the plurality of green given image regions in which the color coordinate points are in the second given region, the second weighted average, and the second coordinate component of the estimated coordinate point (step S08). The processing circuit 22 multiplies the first white balance gains by the first color components of the plurality of given image regions and multiplies the second white balance gains by the second color components of the plurality of given image regions, to compensate for the plurality of given image regions (step S09).

In some embodiments, when the determining result of performing step S03 by the processing circuit 22 is that all color coordinate points of the given image regions are not in the first given region (the determining result is "No"), the processing circuit 22 does not perform white balance processing, and the processing circuit 22 waits for other image signals to perform step S01 again.

In some embodiments, when the determining result of performing step S05 by the processing circuit 22 is that the color coordinate point of the given image region is no in the second given region (the determining result is "No"), the second given region does not include any color coordinate point of the given image region, and the number of the green given image regions is zero. The processing circuit 22 only needs to perform a reciprocal operation according to the first weighted average generated by performing step S04, to generate the first white balance gain, and performs a reciprocal operation according to the second weighted average generated by performing step S04, to generate the second white balance gain (step S10). The processing circuit 22 continues to perform step S09.

Figure 3:
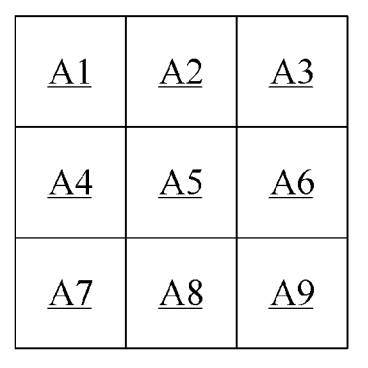
Figure 4:
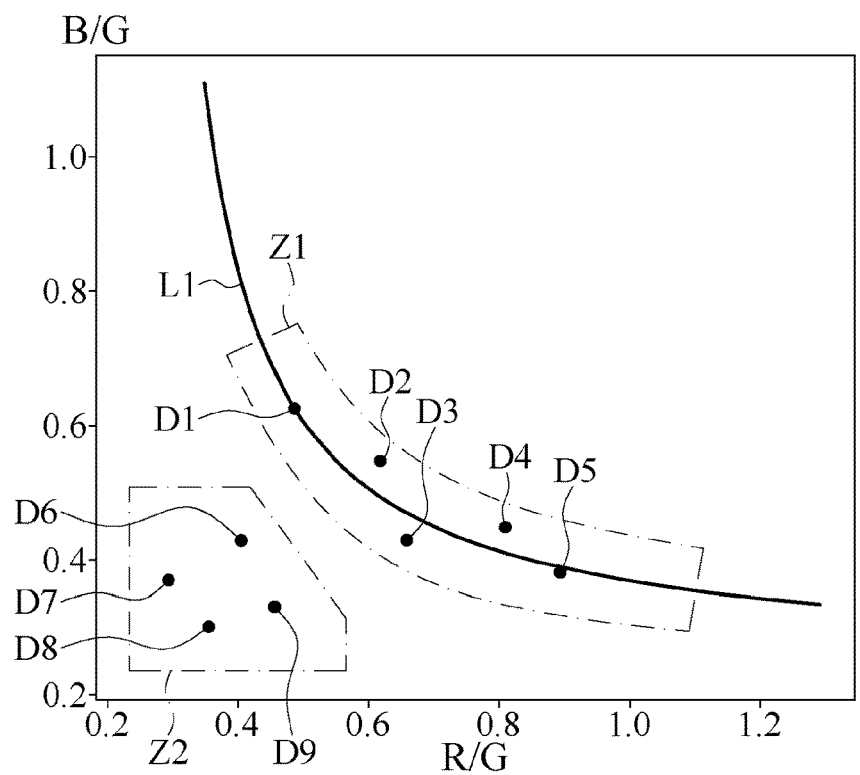
FIG. 4 is a schematic diagram of an embodiment of a given color coordinate plane and a coordinate point thereon according to the present disclosure.

In some embodiments, referring to FIG. 3 and FIG. 4, in FIG. 3, for example, the image signal S1 includes nine given image regions A1-A9. FIG. 4 illustrates a given color coordinate plane including a first given region Z1 and a second given region Z2. In step S02, the processing circuit 22 calculates nine color coordinate points D1-D9 corresponding to the given image regions A1-A9 on the given color coordinate plane, and the processing circuit 22 determines that color coordinate points D1-D5 are in the first given region Z1 (a determining result is Yes) in step S03, and determines that color coordinate points D6-D9 are in the second given region Z2 (a determining result is Yes) in step S05. The processing circuit 22 performs step S04 to calculate a first weighted average according to a plurality of first coordinate components and first weight values of the color coordinate points D1-D5, and calculate a second weighted average according to a plurality of second coordinate components and second weight values of the color coordinate points D1-D5. The processing circuit 22 performs step S06 and step S07 to calculate a first coordinate component and a second coordinate component of an estimated coordinate point in the first given region Z1 according to the color coordinate points D6-D9. Finally, the processing circuit 22 performs step S08 and S09 according to the number 5 of white given image regions corresponding to the color coordinate points D1-D5, the number 4 of green given image regions corresponding to the color coordinate points D6-D9, the first weighted average, the second weighted average, and the first coordinate component and the second coordinate component of the estimated coordinate point.

Based on this, the processing circuit 22 of the image white balance processing device may perform white balance processing to perform white balance compensation for the image signal S1, and the processing circuit 22 performs white balance compensation according to the two given regions Z1, Z2. In this way, a problem that a color cast cannot be resolved according to a gray world algorithm because the image signal S1 has a large number of large green blocks can be resolved, so that a color of an image signal S2 generated after the white balance processing is closer to a color effect perceived by human eyes.

In some embodiments, when the processing circuit 22 determines that at least one color coordinate point is in the second given region Z2 (the determining result is "Yes") in step S05, the processing circuit 22 further determines whether the number of green given image regions in the second given region Z2 is greater than or equal to a given value (step S11), where the given value can be adjusted. If a determining result is that the number of color coordinate points of the green given image regions is greater than or equal to the given value (the determining result is "Yes"), it indicates that information of the green given image regions is helpful for the processing circuit 22 to perform white balance processing, and the processing circuit 22 continues to perform step S06. If the determining result is that the number of color coordinate points of the green given image regions is less than the given value (the determining result is "No"), it indicates that the information of the green given image regions is not helpful for the processing circuit 22 to perform white balance processing, and the processing circuit 22 continues to perform step S10.

In some embodiments, the processing circuit 22 divides the image signal S1 into l given image regions, where an $i^{th}$ given image region in the l given image regions includes a plurality of first color components $R_N$, a plurality of second color components $B_N$, and a plurality of third color components $G_N$, and N represents the number of pixels in the $i^{th}$ given image region. Taking the image signal S1 in FIG. 3 as an example, l is 9, and i may be 1 to 9 respectively corresponding to the given image regions A1-A9.

In some embodiments, in step S02, the processing circuit 22 performs an averaging operation according to the plurality of first color components $R_N$ of the $i^{th}$ given image region in the l given image regions to generate a first color average R_mean$_i$ corresponding to each given image region i, the processing circuit 22 performs an averaging operation according to second color components $B_N$ of each given image region i to generate a second color average B_mean$_i$ corresponding to the $i^{th}$ given image region, and the processing circuit 22 performs an averaging operation according to third color components $G_N$ of each given image region i to generate a third color average G_mean$_i$ corresponding to the $i^{th}$ given image region. In other words, each given image region i includes the first color average R_mean$_i$, the second color average B_mean$_i$, and the third color average G_mean$_i$. The first color average R_mean$_i$, the second color average B_mean$_i$, and the third color average G_mean$_i$ can be expressed by the following formulas:

$$\text{R\_mean}_i = \frac{\left(\sum_{n \in area_i} R_N\right)}{N}; \quad \text{Formula 1.1}$$

$$\text{B\_mean}_i = \frac{\left(\sum_{n \in area_i} B_N\right)}{N}; \quad \text{Formula 1.2}$$

$$\text{G\_mean}_i = \frac{\left(\sum_{n \in area_i} G_N\right)}{N}. \quad \text{Formula 1.3}$$

Taking the image signal S1 in FIG. 3 as an example, a first color average of the given image region A1 is represented as R_mean$_i$, a second color average of the given image region A1 is represented as B_mean$_1$, and a third color average of the given image region A1 is represented as G_mean$_1$. The given image regions A2-A9 are analogous to the foregoing.

After the processing circuit 22 obtains the first color average R_mean$_i$, the second color average B_mean$_i$, and the third color average G_mean$_i$ of the i$^{th}$ given image region, the processing circuit 22 divides the first color average R_mean$_i$ by the third color average G_mean$_i$ to generate a first coordinate component RG$_i$ of a color coordinate point corresponding to the i$^{th}$ given image region on the given color coordinate plane, and the processing circuit 22 divides the second color average B_mean$_i$ by the third color average G_mean$_i$ to generate a second coordinate component BG$_i$ of the color coordinate point corresponding to the i$^{th}$ given image region on the given color coordinate plane. A color coordinate point of each given image region i on the given color coordinate plane is expressed as (RG$_i$, BG$_i$). The first coordinate component RG$_i$ and the second coordinate component BG$_i$ can be expressed by the following formulas:

$$RG_i = \frac{R\_mean_i}{G\_mean_i};$$  Formula 2.1

$$BG_i = \frac{B\_mean_i}{G\_mean_i}.$$  Formula 2.2

Taking the image signal S1 in FIG. 3 as an example, a first coordinate component and a second coordinate component of the given image region A1 are respectively expressed as RG$_1$ and BG$_1$. The given image regions A2-A9 are analogous to the foregoing.

In some embodiments, the plurality of color coordinate points calculated in step S02 correspond to the given color coordinate plane, some color coordinate points in the plurality of color coordinate points are in the first given region Z1, and the some other color coordinate points are in the second given region Z2. The processing circuit 22 performs step S03 after step S02. In step S03, determining is performed on all color coordinate points. When a determining result is that the color coordinate point (RG$_i$,BG$_i$) of the i$^{th}$ given image region is in the first given region Z1, the processing circuit 22 performs step S04 on the i$^{th}$ given image region, where M white given image regions in the l given image regions are in the first given region Z1. The processing circuit 22 performs weighted averaging according to a first coordinate component RG$_m$ and a first weight value W$_{am}$ corresponding to the first coordinate component RG$_m$ of a color coordinate point (RG$_m$, BG$_m$) corresponding to the m$^{th}$ white given image region in the M white given image regions, to calculate a first weighted average RG of the M white given image regions, and the processing circuit 22 performs weighted averaging according to a second coordinate component BG$_m$ and a second weight value W$_{bm}$ corresponding to the second coordinate component BG$_m$, to calculate a second weighted average BG of the M white given image regions. The first weighted average RG and the second weighted average BG can be expressed by the following formulas:

$$RG = \frac{\sum_{m=1}^{M} W_{am} \times RG_m}{\sum_{m=1}^{M} W_{am}};$$  Formula 3.1

$$BG = \frac{\sum_{m=1}^{M} W_{bm} \times BG_m}{\sum_{m=1}^{M} W_{bm}}.$$  Formula 3.2

Taking the image signal S1 in FIG. 3 and the color coordinate points D1-D9 corresponding to the given image regions A1-A9 in FIG. 4 as an example, the number M of the white given image regions is 5, and m can be 1 to 5. It is assumed that the given image region A1 is the first white given image region in the first given region Z1, that is, m is 1, a first coordinate component and a second coordinate component of the color coordinate point D1 corresponding to the given image region A1 are RG$_i$ and BG$_1$ respectively, a first weight value corresponding to the first coordinate component RG$_i$ is W$_{a1}$, and a second weight value corresponding to the second coordinate component BG$_1$ is W$_{b1}$. The given image regions A2-A5 are analogous to the foregoing.

In some embodiments, in step S05, when the determining result is that when the color coordinate point (RG$_i$,BG$_i$) of the i$^{th}$ given image region is in the second given region Z2, the processing circuit 22 performs step S11. When the determining result is that the number of green given image regions is greater than or equal to the given value, the processing circuit 22 performs step S06. The processing circuit 22 performs averaging according to a first coordinate component RG$_q$ of a color coordinate point (RG$_q$, BG$_q$) corresponding to the q$^{th}$ green given image region in Q green given image regions, to calculate a first average RG_Green of the Q green given image regions, and the processing circuit 22 performs averaging according to a second coordinate component BG$_q$ to calculate a second average BG_Green of the Q green given image regions. The first average RG_Green and the second average BG_Green can be expressed by the following formulas:

$$RG\_Green = \frac{\sum_{q=1}^{Q} RG_q}{Q};$$  Formula 4.1

$$BG\_Green = \frac{\sum_{q=1}^{Q} BG_q}{Q}.$$  Formula 4.2

Taking the image signal S1 in FIG. 3 and the color coordinate points D1-D9 in FIG. 4 as an example, the number Q of the green given image regions is 4, and q can be 1 to 4. It is assumed that the given image region A6 is the first green given image region in the second given region Z2, that is, q is 1, and a first coordinate component and a second coordinate component of the color coordinate point D6 corresponding to the given image region A6 are RG$_1$ and BG$_1$ respectively. The given image regions A7-A9 are analogous to the foregoing. The given image region A7 has q of 2, and a first coordinate component and a second coordinate component of the color coordinate point D7 corresponding to the given image region A7 are $RG_2$ and $BG_2$ respectively. The given image region A8 has q of 3, and a first coordinate component and a second coordinate component of the color coordinate point D8 corresponding to the given image region A8 are $RG_3$ and $BG_3$ respectively. The given image region A9 has q of 4, and a first coordinate component and a second coordinate component of the color coordinate point D9 corresponding to the given image region A9 are $RG_4$ and $BG_4$ respectively.

Figure 5:
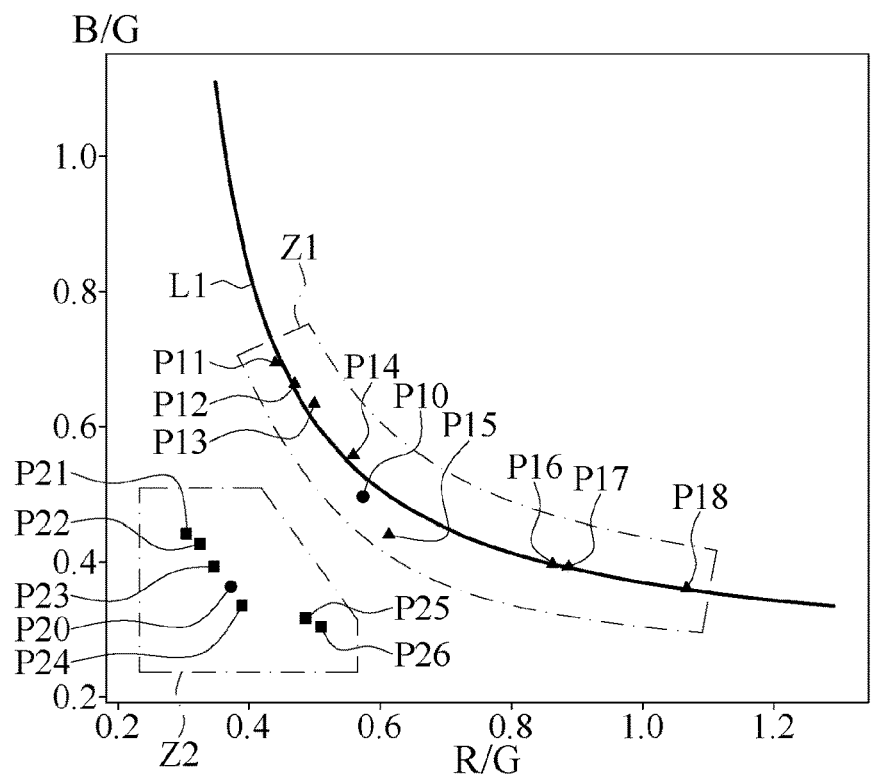
FIG. 5 is a schematic diagram of another embodiment of a given color coordinate plane and a coordinate point thereon according to the present disclosure.

In some embodiments, referring to FIG. 5, FIG. 5 is the given color coordinate plane including the first given region Z1 and the second given region Z2. The first given region Z1 includes first coordinate points P11-P18 generated by respectively illuminating a plurality of different color temperature light sources on gray, and the second given region Z2 includes second coordinate points P21-P26 generated by respectively illuminating the plurality of different color temperature light sources on green. In step S07, the processing circuit 22 corresponds the first average value RG_Green and the second average value BG_Green to the given color coordinate plane to generate an average color coordinate point P20, that is, the average color coordinate point P20 is expressed as (RG_Green,BG_Green). The processing circuit 22 obtains two (a second coordinate point P23 and a second coordinate point P24) of the second coordinate points P21-P26 in the second given region Z2 that are adjacent to an average color coordinate point P20. In the first given region Z1, the processing circuit 22 calculates two (a first coordinate point P14 and a first coordinate point P15) of the first coordinate points P11-P18 under the same color temperature light source as the second coordinate point P23 and the second coordinate point P24. The processing circuit 22 may perform a projection method according to the second coordinate point P23, the second coordinate point P24, the first coordinate point P14, and the first coordinate point P15 to generate an estimated coordinate point P10. The estimated coordinate point P10 includes one coordinate component RG_est and another coordinate component BG_est, which are expressed as (RG_est, BG_est), where the estimated coordinate point P10 is in the first given region Z1.

In some embodiments, in step S08, the processing circuit 22 sums a product of the first weighted average RG and the number M of the white given image regions and a product of a coordinate component RG_est of the estimated point P10 and the number Q of the green given image regions, and divides the sum by a total number of the number M of the plurality of white given image regions and the number Q of the plurality of green given image regions, to perform averaging to generate a first final average RG_final. The processing circuit 22 sums a product of the second weighted average BG and the number M of the white given image regions and a product of another coordinate component BG_est of the estimated point P10 and the number Q of the green given image regions, and divides the sum by a total number of the number M of the plurality of white given image regions and the number Q of the plurality of green given image regions, to perform averaging to generate a second final average BG_final. The first final average RG_final and the second final average BG_final can be expressed by the following formulas:

$$RG\_final = \frac{M \times RG + Q \times RG\_est}{M+Q}; \quad \text{Formula 5.1}$$

$$BG\_final = \frac{M \times BG + Q \times BG\_est}{M+Q}. \quad \text{Formula 5.2}$$

Then, the processing circuit 22 performs a reciprocal operation according to the first final average RG_final to generate a first white balance gain R_Gain_final, and the processing circuit 22 performs a reciprocal operation according to the second final average BG_final to generate a second white balance gain B_Gain_final. The first white balance gain R_Gain_final and the second white balance gain B_Gain_final can be expressed by the following formulas:

$$R\_Gain\_final = \frac{1}{RG\_final}; \quad \text{Formula 6.1}$$

$$B\_Gain\_final = \frac{1}{BG\_final}. \quad \text{Formula 6.2}$$

In some embodiments, the first weighted average RG generated by the processing circuit 22 according to the calculation formula 3.1 in step S04 is equal to RG_final, and the second weighted average BG generated according to the calculation formula 3.2 in step S04 is equal to BG_final. The processing circuit 22 generates the first white balance gains R_Gain_final and the second white balance gain B_Gain_final according to RG_final and BG_final and according to the calculation formulas 6.1 and 6.2. In step S10, the processing circuit 22 may calculate the first white balance gain R_Gain_final and the second white balance gain B_Gain_final according to formulas 6.3 and 6.4:

$$R\_Gain\_final = \frac{1}{RG\_final} = \frac{1}{RG}; \quad \text{Formula 6.3}$$

$$B\_Gain\_final = \frac{1}{BG\_final} = \frac{1}{RB}. \quad \text{Formula 6.4}$$

In some embodiments, when the processing circuit 22 generates the first white balance gain R_Gain_final and the second white balance gain B_Gain_final according to the calculation formulas 6.1 and 6.2 or according to the calculation formulas 6.3 and 6.4, in step S09, the processing circuit 22 multiplies the first white balance gain R_Gain_final by a plurality of first color components $R_N$ of the $i^{th}$ given image region in the I given image regions, and multiplies the second white balance gain B_Gain_final by a plurality of second color components $B_N$ of the $i^{th}$ given image region to generate a compensated $i^{th}$ given image region. Similarly, the processing circuit 22 compensates for the l given image regions to generate a compensated image signal S2.

In some embodiments, for a plurality of pixels included in each given image region, a first color component $R_N$ in each pixel may represent red information, a second color component $B_N$ in each pixel may represent blue information, and a third color component $G_N$ in each pixel may represent green information. The red information, the blue information, and the green information in each pixel represent red, blue, and green in different shades.

In some embodiments, as shown in FIG. 5, eight different color temperature light sources of 1800K, A (2800K), U30 (3000K), CWF (4100K), D50 (5000K), D65 (6500K), D75

(7500K), and 9000K are respectively irradiated to gray in the standard 24-color checker, and a gray image corresponding to each color temperature light source is generated after the irradiation. Each gray image includes an average color component corresponding to red information, an average color component corresponding to blue information, and an average color component corresponding to green information. According to the aforementioned three average color components, a total of eight first coordinate points P11-P18 corresponding to each color temperature light source can be generated on the given color coordinate plane. The first coordinate points P11-P18 include a first given white coordinate component that is a horizontal component and a second given white coordinate component that is a vertical component. The first given white coordinate component is a ratio of an average of color components corresponding to red information of each pixel in a gray image and an average of color components corresponding to green information of each pixel, and the second given white coordinate component is a ratio of an average of color components corresponding to blue information of each pixel in the gray image and the average of the color components corresponding to the green information.

In addition, a highest color temperature (above 7500K) and a lowest color temperature (below 2000K) are not common in general color pictures, and green at the highest color temperature and the lowest color temperature is easily confused with non-green at other color temperatures. Therefore, the lowest color temperature and the highest color temperature are removed from the eight color temperature light sources. Six different color temperature light sources of A (2800K), U30 (3000K), CWF (4100K), D50 (5000K), D65 (6500K), and D75 (7500K) are respectively irradiated to green in the standard 24-color checker, and a green image corresponding to each color temperature light source is generated after the irradiation. Each green image includes an average color component corresponding to red information, an average color component corresponding to blue information, and an average color component corresponding to green information. According to the aforementioned three average color components, a total of six second coordinate points P21-P26 corresponding to each color temperature light source can be generated on the given color coordinate plane. The second coordinate points P21-P26 include a first given green coordinate component that is a horizontal component and a second given green coordinate component that is a vertical component. The first given green coordinate component is a ratio of an average of color components corresponding to red information of each pixel in a green image and an average of color components corresponding to green information of each pixel, and the second given green coordinate component is a ratio of an average of color components corresponding to blue information of each pixel in the green image and the average of the color components corresponding to the green information.

In some embodiments, as shown in FIG. 5, the given color coordinate plane further includes a fitting curve L1. The fitting curve L1 is stored in the storage circuit 21, and the fitting curve L1 may be generated by performing curve fitting (fit theory) according to the first coordinate points P11-P18.

In some embodiments, the first given region Z1 includes two boundaries located on both sides of the fitting curve L1 and extending along the fitting curve L1, and the first given region Z1 is a region including all first coordinate points P11-P18. A boundary range of the first given region Z1 can be adjusted.

In some embodiments, the second given region Z2 does not overlap the first given region Z1, and the second given region Z2 is a region including all second coordinate points P21-P26. A boundary range of the second given region Z2 can be adjusted. A proportion of green information of first given green coordinate components and second given green coordinate components in the second coordinate points P21-P26 to red information and blue information is greater than a proportion of green information of first given white coordinate components and second given white coordinate components in the first coordinate points P11-P18 to red information and blue information. Therefore, on the given color coordinate plane, a distance between each of the second coordinate points P21-P26 and an origin of the given color coordinate plane is less than a distance between each of the first coordinate points P11-P18 and the origin of the given color coordinate plane, that is, the second given region Z2 is located at the lower left of the first given region Z1 and is closer to the origin of the given color coordinate plane.

In some embodiments, the image capturing circuit 1 may include a photosensitive element, and the image capturing circuit 1 may convert a captured optical image into the image signal S1.

In summary, according to the image white balance processing method and device of the present disclosure, white balance processing can be quickly performed, and a color cast phenomenon in the input color picture can be effectively resolved. Especially when the image signal has large green blocks, the green given image regions in the second given region assist the white given image regions in the first given region to perform white balance processing, so that white balance compensation can be performed on the given image region, thereby resolving the color case problem caused by the large green blocks during white balance processing.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. An image white balance processing method, comprising:
   receiving an image signal, the image signal comprising a plurality of given image regions, each of the given image regions comprising a plurality of first color components, a plurality of second color components, and a plurality of third color components;
   calculating a color coordinate point of each of the given image regions on a given color coordinate plane according to the first color components, the second color components, and the third color components of each of the given image regions;
   determining whether the color coordinate point of each of the given image regions is in a first given region of the given color coordinate plane, the first given region being a region formed by a plurality of first coordinate points on the given color coordinate plane that are generated by respectively irradiating a plurality of color temperature light sources on gray;
   when a plurality of white given image regions in the given image regions are in the first given region, calculating a first weighted average according to a first coordinate component and a first weight value of the color coordinate point of each of the white given image regions, and calculating a second weighted average according to a second coordinate component and a second weight value of each of the white given image regions;

determining whether the color coordinate point of each of the given image regions is in a second given region of the given color coordinate plane, the second given region being a region formed by a plurality of second coordinate points on the given color coordinate plane that are generated by respectively irradiating the plurality of color temperature light sources on green;

when a plurality of green given image regions in the given image regions are in the second given region, calculating a first average according to a first coordinate component of each of the green given image regions, and calculating a second average according to a second coordinate component of each of the green given image regions;

calculating a first coordinate component and a second coordinate component of an estimated coordinate point in the first given region according to the first average and the second average;

calculating a first white balance gain of the first color component according to the number of the white given image regions, the number of the green given image regions, the first weighted average, and the first coordinate component of the estimated coordinate point;

calculating a second white balance gain of the second color component according to the number of the white given image regions, the number of the green given image regions, the second weighted average, and the second coordinate component of the estimated coordinate point; and compensating for the given image regions according to the first white balance gain and the second white balance gain.

2. The image white balance processing method according to claim 1, wherein the step of calculating the color coordinate point of each of the given image regions on the given color coordinate plane comprises:

performing an average operation according to the first color components of each of the given image regions to generate a first color average of each of the given image regions;

performing an average operation according to the second color components of each of the given image regions to generate a second color average of each of the given image regions;

performing an average operation according to the third color components of each of the given image regions to generate a third color average of each of the given image regions;

generating a first coordinate component of the color coordinate point of each of the given image regions by dividing the first color average by the third color average; and generating a second coordinate component of the color coordinate point of each of the given image regions by dividing the second color average by the third color average.

3. The image white balance processing method according to claim 1, wherein the step of calculating the estimated coordinate point comprises:

generating an average color coordinate point corresponding to the given color coordinate plane and within the second given region according to the first average and the second average;

calculating corresponding two of the first coordinate points according to two of the second coordinate points adjacent to the average color coordinate point; and performing a projection method according to the two of the second coordinate points adjacent to the average color coordinate point and the corresponding two of the first coordinate points to generate the estimated coordinate point.

4. The image white balance processing method according to claim 1, wherein the step of calculating the first white balance gain and the second white balance gain comprises:

after the estimated coordinate point having the first coordinate component and the second coordinate component is calculated, summing a product of the first weighted average and the number of the white given image regions and a product of first coordinate components of the green given image regions and the number of the green given image regions to generate a summation result;

generating a first final average according to the summation result;

summing a product of the second weighted average and the number of the white given image regions and a product of second coordinate components of the green given image regions and the number of the green given image regions to generate another summation result;

generating a second final average according to the another summation result; and respectively performing a reciprocal operation according to the first final average and the second final average to generate the first white balance gain and the second white balance gain.

5. The image white balance processing method according to claim 1, further comprising:

when the green given image regions are in the second given region, determining whether the number of the green given image regions is greater than or equal to a given value; and if the number of the green given image regions is greater than or equal to the given value, performing an average operation according to the first coordinate component and the second coordinate component of each of the green given image regions to calculate the first average and the second average.

6. The image white balance processing method according to claim 5, further comprising: when the number of the green given image regions is less than the given value, performing a reciprocal operation according to the first weighted average to generate the first white balance gain, and performing a reciprocal operation according to the second weighted average to generate the second white balance gain.

7. The image white balance processing method according to claim 1, wherein the first color components are red information, the second color components are blue information, and the third color components are green information, and the step of compensating for the given image regions according to the first white balance gain and the second white balance gain comprises:

multiplying the first white balance gain by the first color components of each of the given image regions to generate a compensated image signal; and multiplying the second white balance gain by the second color components of each of the given image regions to generate the compensated image signal.

8. The image white balance processing method according to claim 1, wherein each of the first coordinate points comprises a first given white coordinate component and a second given white coordinate component, and each of the second coordinate points comprises a first given green coordinate component and a second given green coordinate component.

9. The image white balance processing method according to claim 1, wherein color temperatures of the color temperature light sources generating the second coordinate points are less than 7500K and greater than 2000K.

10. The image white balance processing method according to claim 1, further comprising:
   generating a fitting curve according to the first coordinate points; and
   generating the first given region according to the fitting curve.

11. The image white balance processing method according to claim 1, wherein the second given region does not overlap the first given region, the first given region comprises all the first coordinate points, the second given region comprises all the second coordinate points, and a distance between the second coordinate points and an origin of the given color coordinate plane is less than a distance between the first coordinate points and the origin of the given color coordinate plane.

\* \* \* \* \*